United States Patent [19]
Lacey

[11] 3,888,451
[45] June 10, 1975

[54] VEHICLE SEATS

[75] Inventor: Robert R. Lacey, Bromham, England

[73] Assignee: Universal Oil Products Company, Des Plaines, Ill.

[22] Filed: Dec. 4, 1973

[21] Appl. No.: 421,712

[30] Foreign Application Priority Data
Dec. 6, 1972  United Kingdom............ 56193/72

[52] U.S. Cl. ............... 248/399; 248/423; 267/133
[51] Int. Cl. ........................................... B60n 1/02
[58] Field of Search ...... 16/191; 248/399, 157, 423, 248/421, 432, 373, 374, 378; 267/131, 133; 297/304, 363

[56] References Cited
UNITED STATES PATENTS

| 1,681,643 | 8/1928 | Kimbro | 297/363 |
| 2,996,278 | 8/1961 | Iorio | 248/399 |
| 3,025,032 | 3/1962 | Leja | 248/399 |
| 3,109,621 | 11/1963 | Simons et al. | 248/399 |
| 3,423,060 | 1/1969 | Fulling et al. | 248/399 |
| 3,493,211 | 2/1970 | Barecki et al. | 248/399 |
| 3,504,881 | 4/1970 | Pillons et al. | 248/374 |
| 3,519,241 | 7/1970 | Tschursch | 248/399 |
| 3,632,167 | 1/1972 | Sinfield | 248/423 |
| 3,718,257 | 9/1955 | Lie | 248/373 |
| 3,774,963 | 11/1973 | Lowe | 248/399 |

Primary Examiner—Roy D. Frazier
Assistant Examiner—Lawrence J. Staab
Attorney, Agent, or Firm—James R. Hoatson, Jr.; Barry L. Clark; William H. Page II

[57] ABSTRACT

Suspension seat for vehicles such as tractors which traverse rough terrain includes a torsion bar which may be adjustably preloaded to accomodate various weights of occupants or to vary the height of the ride zone. A stepped, slidably adjustable stop member cooperates with an abutment on the tubular torsion bar housing to adjustably limit the upward movement as well as the total movement of the seat suspension.

7 Claims, 6 Drawing Figures

FIG. I.

VEHICLE SEATS

BACKGROUND OF THE INVENTION

This invention relates to vehicle seats having a spring suspension, and is particularly applicable to seats for tractors or other vehicles designed for use over rough terrain.

The present invention provides a vehicle seat comprising a seat support and a base support interconnected and guided for upward and downward relative movement by a spring suspension, the spring suspension comprising a coupling arm having a first pivotal connection between an end part of the arm and the base support and a second pivotal connection between the opposite end part of the arm and the seat support, one of said pivotal connections comprising a torsion bar extending axially within a tube, the tube being rigidly journalled in the adjacent one of said supports and rigidly connected to said arm, the torsion bar being rigidly connected, at spaced positions along its length to the tube and to the support, respectively, the connection to said support being through a torque-transmitting coupling, and an up-stop device for limiting upward movement of the seat support, the up-stop device comprising an abutment fixed on the tube, a guide mounted on the adjacent support and extending transversely of the seat and an abutment slidably mounted in the guide, one of said abutments having steps thereon extending longitudinally of the guide, each step of one abutment at a different angular position of the tube relative to the adjacent said support thereby to halt the upward movement of the seat support at a different height relative to the base support.

One embodiment of seat according to the invention is illustrated, by way of example, in the accompanying drawings in which.

Figure 1:
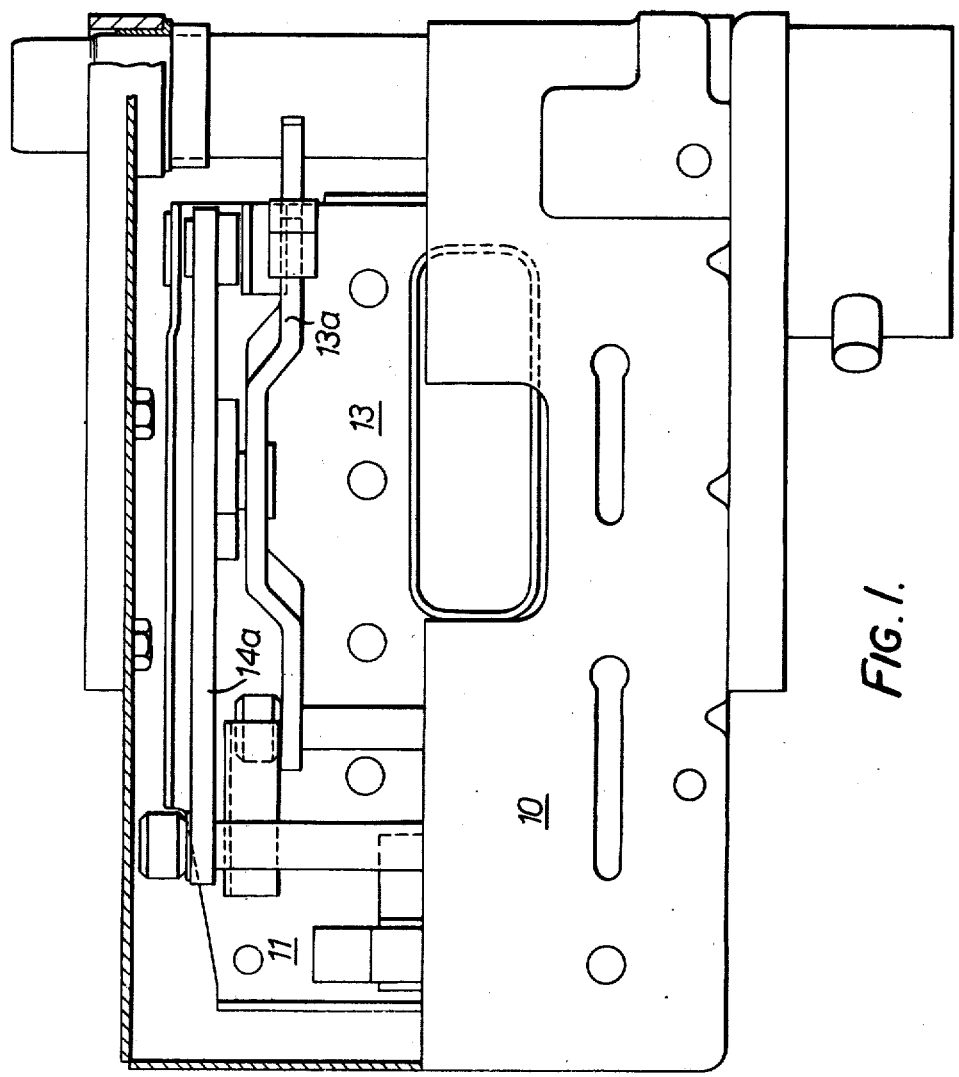
FIG. 1 is a plan view of the seat, part cut-away.
Figure 2:
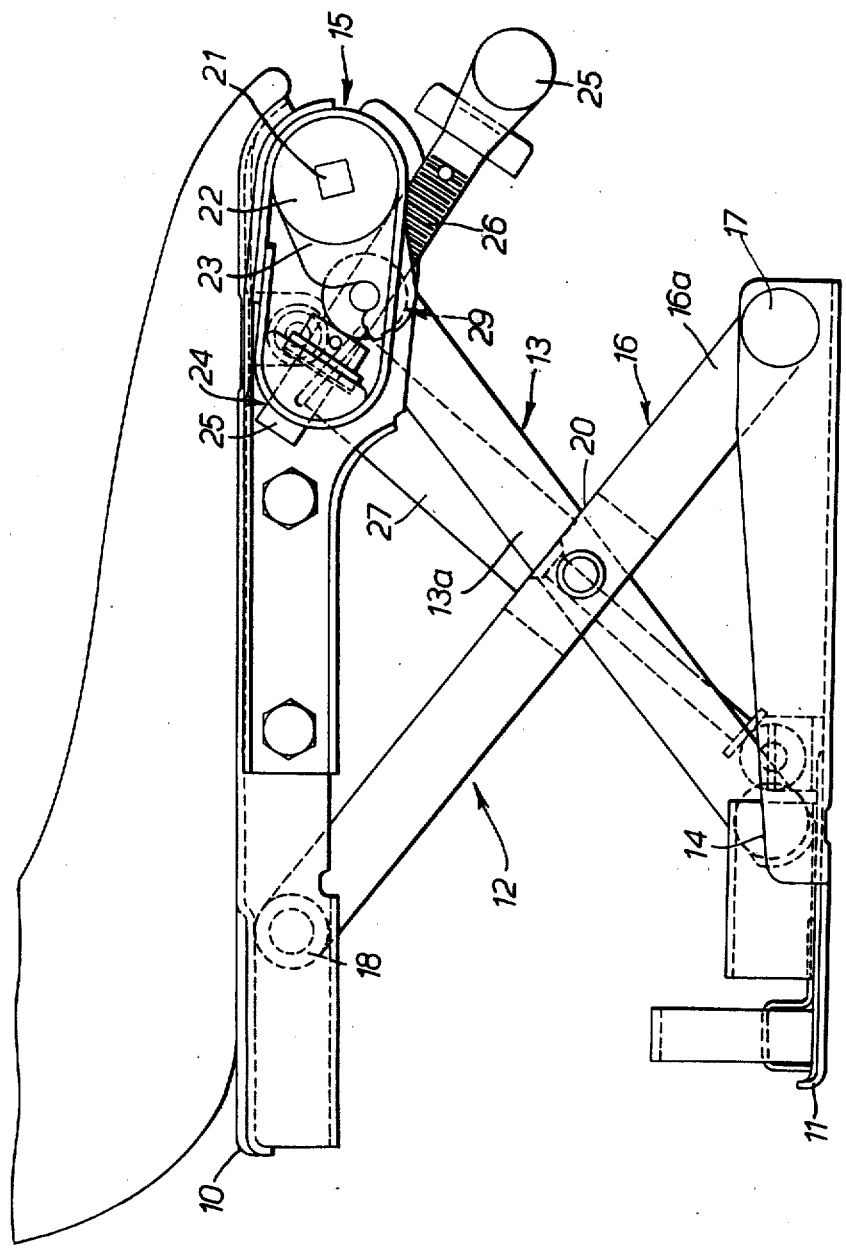
FIG. 2 is a side elevation of the seat of FIG. 1.
Figure 3:
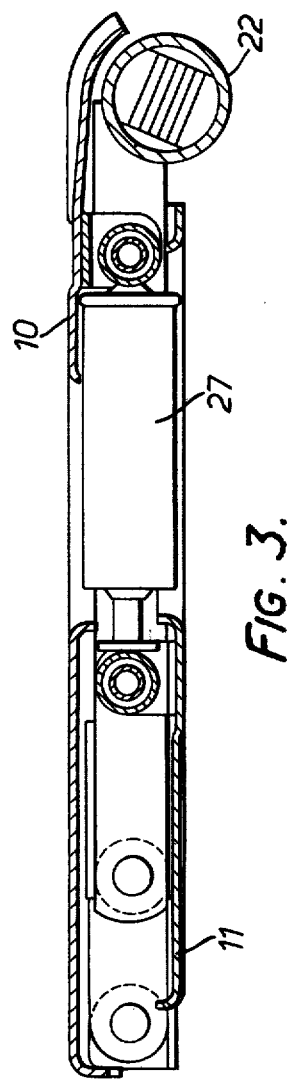
FIG. 3 is a section through the seat in its down-stop position.
Figure 4:
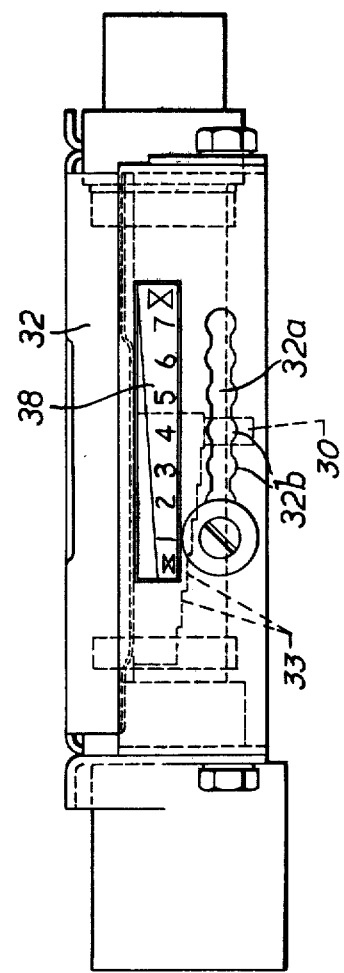
FIG. 4 is a rearward view of the seat showing an up-stop adjustment device.

The basic construction of the seat illustrated in the drawing is similar to that described in U.S. Pat. No. 3,109,621 which is incorporated by reference herein and comprises a flanged plate forming a seat support 10, a second flanged plate forming a base support 11, and a spring suspension 12 interconnecting the seat support and base support and guiding the seat support for upward and downward movement relative to the base support. This spring suspension comprises a first coupling arm 13 having a first pivotal connection 14 at its lower end to the rear of the base support, the arm extending upwardly and forwardly to a second pivotal connection 15 between the upper end of the arm and the front of the seat support. The first coupling arm comprises two arm members 13a formed by the opposite flanges of a flanged plate but alternatively can comprise two parallel-spaced separate arm members. A second coupling arm 16 extends from a pivotal connection 17 at the front of the base support upwardly and rearwardly to a second pivotal connection 18 with the rear of the seat support, the two coupling arms 13, 16 being pivotally interconnected at their intersection 20.

Conveniently the second coupling arm comprises two parallel-spaced arm members 16a disposed on the opposite sides of the first coupling arm 13. To provide the requisite degrees of freedom, two of the pivotal connections are sliding connections, these being shown as the upper and lower rearward connections. The two coupling arms 13, 16 cooperate to maintain the seat support at a desired angle to the base support. However, if desired, one of the two arms can be omitted and replaced by a column upstanding from the base support and having a carriage mounted for upward and downward movement along the column, the seat being pivotally secured to the carriage.

The suspension is biassed upwardly by a torsion bar 21 mounted axially within a tube 22, the tube being rigidly secured to the forward upper end of the first coupling arm 13 on the axis of its connection to the seat support, the tube being journalled in the seat support. One end of the torsion bar is secured to one end of the tube and the other end supports a radial torque-transmitting arm 23 which is connected at its outer end to the seat support by a screw-operated weight-adjustment device 24. This device comprises a screw 26 journalled for rotation about its axis on the seat support, without translational movement, and carrying a nut 29 which is engaged by the outer hooked end of the arm 23. Rotation of a handle 25 at one end of the screw 26 of the weight-adjustment device is effective to rotate the torque-transmitting arm 23 about the axis of the torsion bar to increase or decrease the preload in the bar and hence to raise or lower the static-load position of the seat to match the weight of the seat occupant and so locate the seat at a selected height.

A shock-absorber 27 is connected between the seat support 10 and the base support 11 to damp vibrations.

A rubber bumper (not shown) forming a down-stop can be located between the seat and base supports, or form part of the shock-absorber or be located in one of the sliding connections, to limit the downward travel of the seat support toward the base support.

In the event of driving over particularly rough ground, the driver may wish to raise the static-load position of the seat further away from the down-stop position, but this makes it desirable also to raise the up-stop position.

Figure 5:
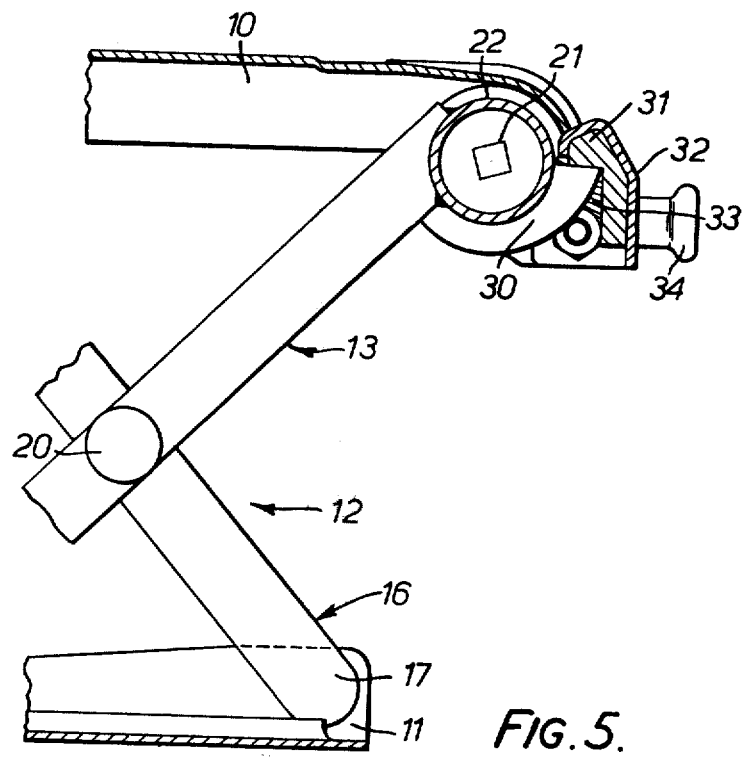
FIGS. 5 and 6 are sections through the seat in the up-stop position and ride position respectively, showing the location of an up-stop adjustment device.
Figure 6:
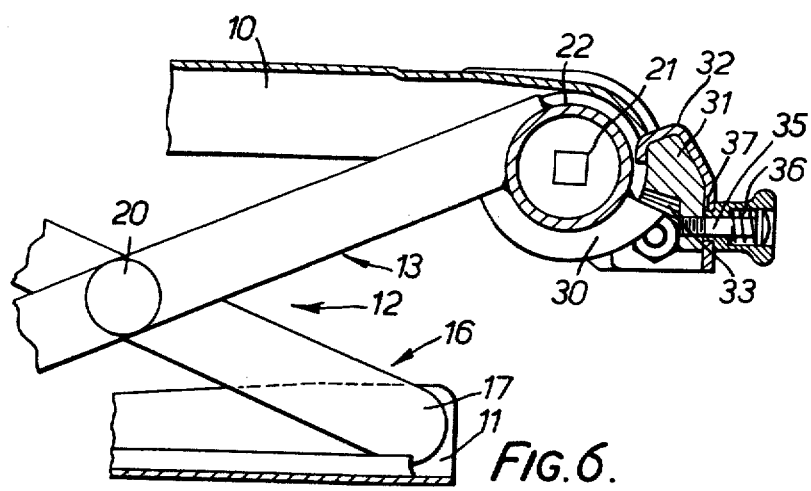

A movable up-stop is provided by an abutment 30 (FIGS. 5 and 6) rigidly secured to the outer surface of the tube 22 of the torsion spring for rotation therewith as the seat rises or falls, and a cooperating abutment 31 is slidable laterally of the seat within a channel-shaped guide 32 secured to the seat support parallel to the tube.

One face of the sliding abutment has steps 33 spaced apart along its length, these steps being arranged in a succession of angularly spaced axial planes such that in each of a plurality of discrete positions of the sliding abutment along its guide, the abutment 30 on the tube will engage a different step and so be brought to rest at a different angular position relative to the seat support. Each such angular position will thus correspond with a different up-stop position.

The sliding abutment 31 is movable along the guide 32 by means of a handle 34 slidably mounted on a pin 35 projecting from the abutment perpendicular to the guide. The pin is slidable along a slot 32a in the guide, the slot having circular enlargements 32b at the above-mentioned discrete positions of the sliding abutment, and the handle is biassed by a spring 36 towards the slot to urge a circular-section detent 37 on the handle into engagement with a circular enlargement of the slot to lock the sliding abutment in the selected position. The abutment can be moved from one position to another after withdrawal of the detent from the slot by pulling the handle outwardly against the force of the spring. Each discrete position of the sliding abutment can be identified on an adjacent scale 38.

In operation of the seat, the person occupying the seat must first ensure that the preload in the torsion bar as adjusted by the weight-adjuster handle permits his weight to deflect the seat away from the up-stop position. He can then set the up-stop adjuster handle 34 at any desired position on the scale, and re-adjust the preload in the torsion bar to bring the seat to the desired ride position. The recommended ride position is 50 mm below the up-stop position selected by the up-stop adjuster handle.

Alternatively, the occupant of the seat can rotate the weight-adjuster handle 25 until he has positioned the seat in the desired ride position. He then adjusts the up-stop adjuster handle to select an up-stop giving approximately 50 mm suspension movement above the ride position.

I claim as my invention:

1. A vehicle seat comprising a seat support and a base support interconnected and guided for upward and downward relative movement by a spring suspension, the spring suspension comprising a coupling arm having a first pivotal connection between an end part of the arm and the base support and a second pivotal connection between the opposite end part of the arm and the seat support, one of said pivotal connections comprising a torsion bar extending axially within a tube, the tube being journalled in one of said supports and rigidly connected to said arm, means rigidly coupling the torsion bar at spaced positions along its length to the tube and to said one support respectively, the coupling means between the torsion bars and said one support comprising a torque-transmitting coupling, and an adjustable up-stop device for selectively limiting the permissible upward movement of the seat support, the up-stop device comprising an abutment fixed on the tube, a guide mounted on said one support and extending transversely of the seat and an abutment slidably mounted in the guide, one of said abutments having steps thereon extending longitudinally of the guide, each step of one abutment being arranged for engagement with the other abutment at a different angular position of the tube relative to said one support thereby to halt the upward movement of the seat support at a different height relative to the base support.

2. A vehicle seat according to claim 1 wherein the guide is mounted on the seat support at the front of the seat.

3. A vehicle seat according to claim 1 wherein the abutment slidable in said guide is provided with a handle and a detent engageable with the guide at discrete positions thereon on to lock the sliding abutment in a position in which one of said abutments is disposed in the path of relative movement of the other abutment.

4. A vehicle seat according to claim 3 wherein the detent is formed by a projection on said handle engageable in any one of a plurality of spaced recesses in the guide.

5. A vehicle seat according to claim 4 in which the handle is supported for movement away from the guide against the force of a return spring, to permit the detent on the handle to be withdrawn from engagement with the guide.

6. A vehicle seat according to claim 3 wherein the spring suspension includes a second arm intersecting the first-mentioned arm and having pivotal connections at its opposite ends to the seat support and base support and at its intersection with the first arm, two of said pivotal connections being sliding connections.

7. A vehicle seat according to claim 3 wherein said coupling between the torsion bar and said one support comprises a torque-transmitting arm extending radially from the torsion bar, and a screw-adjustment device connecting the outer end of said torque transmitting arm to said one support.

* * * * *